Sept. 6, 1938.  L. R. HALES  2,129,421
MANIKIN AND METHOD OF MAKING THE SAME
Filed Aug. 11, 1936  2 Sheets-Sheet 1
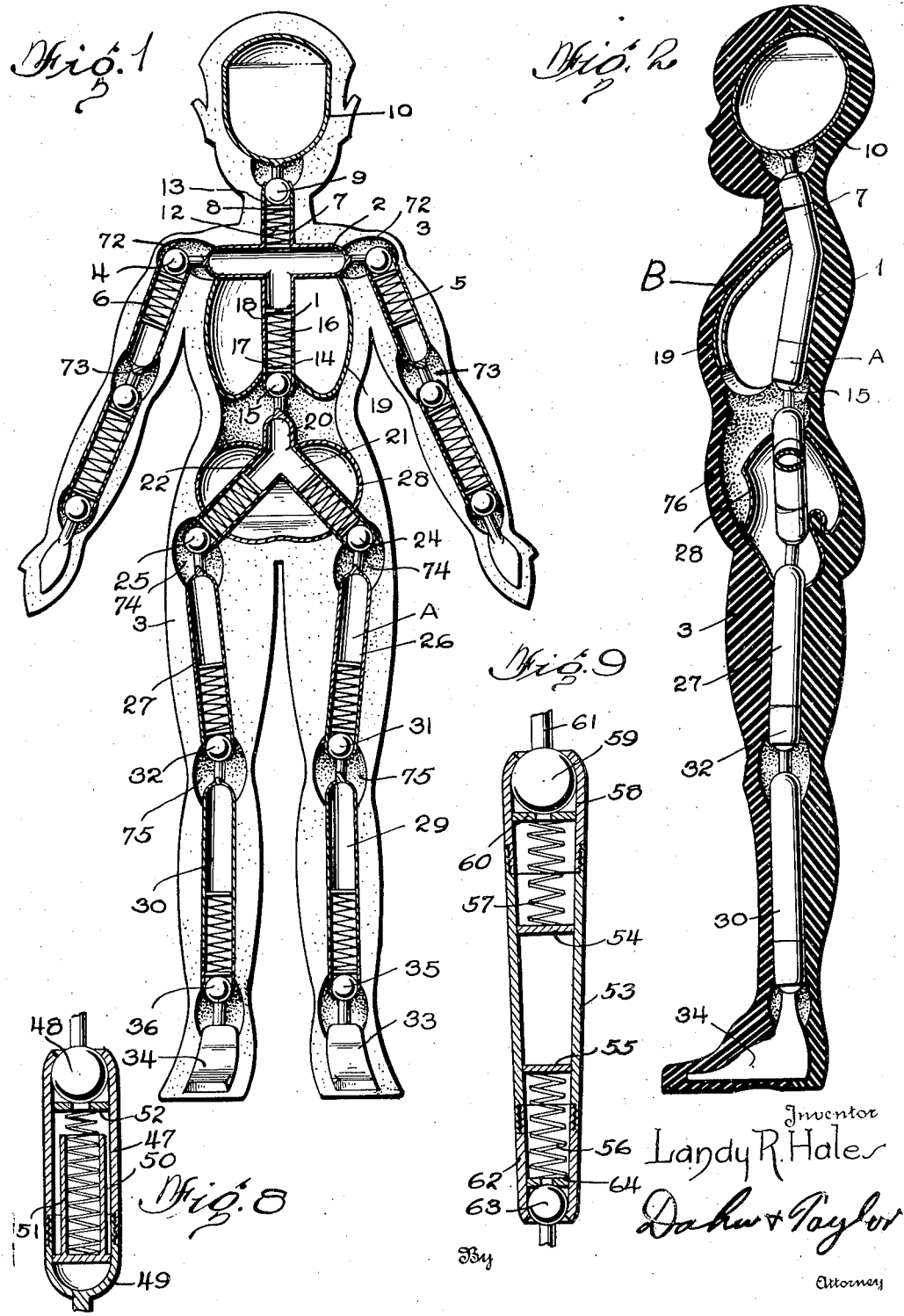
Inventor
Landy R. Hales
By Dahm & Taylor
Attorney Sept. 6, 1938.  L. R. HALES  2,129,421
MANIKIN AND METHOD OF MAKING THE SAME
Filed Aug. 11, 1936   2 Sheets-Sheet 2
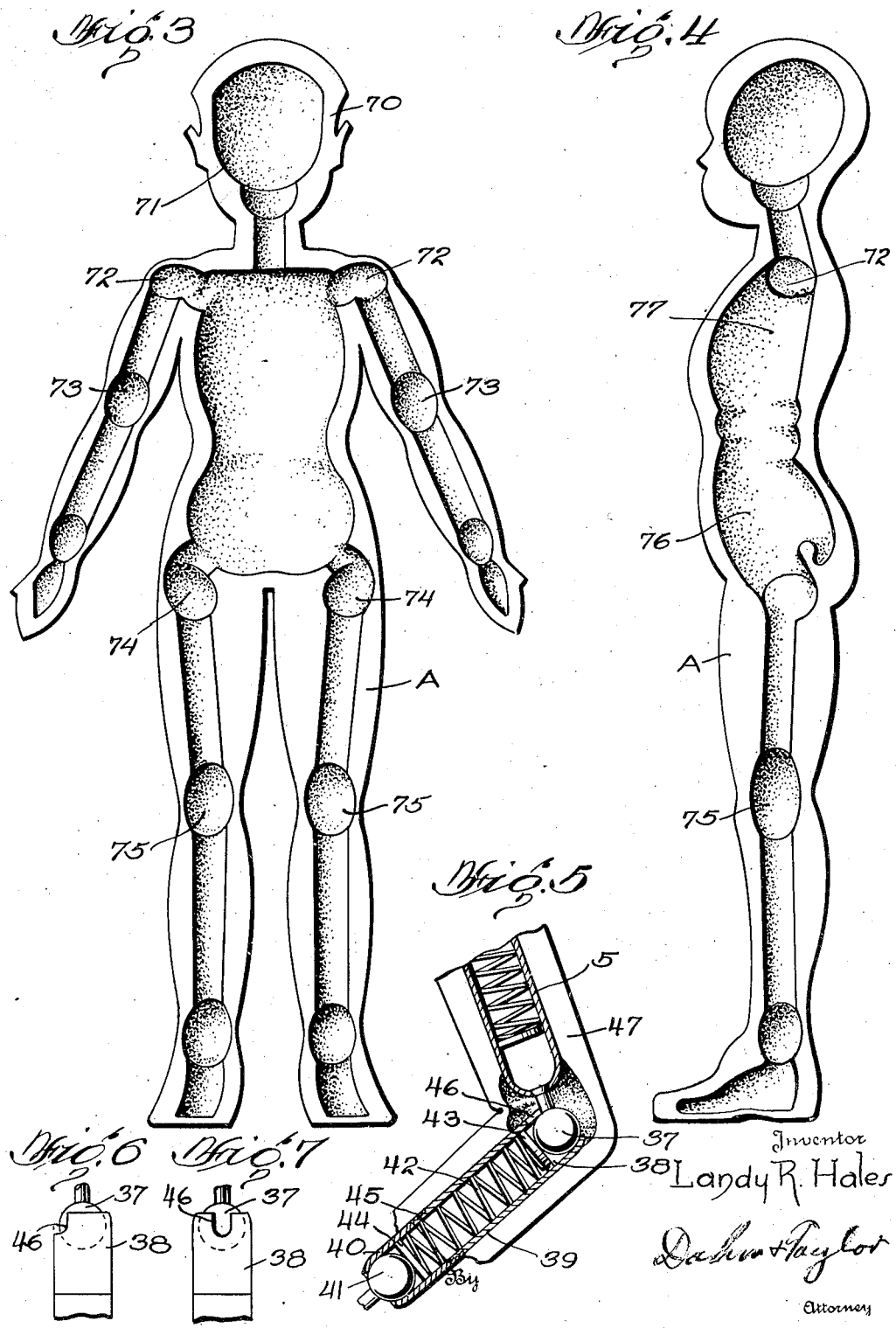

Patented Sept. 6, 1938

2,129,421

UNITED STATES PATENT OFFICE 2,129,421

MANIKIN AND METHOD OF MAKING THE SAME

Landy R. Hales, Elmhurst, N. Y.

Application August 11, 1936, Serial No. 95,401

7 Claims. (Cl. 46—156)

This invention is concerned with manikins and other flexible jointed figures simulating living figures of animals, dolls and similar structures.

The invention relates to the construction as well as to the method of making such figures.

An object of the invention is to provide a lifelike figure of a manikin comprising a jointed skeleton covered with a flexible outer covering of sponge rubber or similar elastic material. Another object is to provide a jointed frame work or skeleton in which the joints are of the ball and socket type and in which the friction in the joints may be controlled by adjustment so that the various members of the frame may be adjusted to different positions and will remain in such adjusted positions until moved to different positions, resisting the tendency of the rubber covering to return the same to the original molded form of the rubber covering.

Another object is to provide a jointed figure having an elastic rubber covering in which the space immediately surrounding the joints is free of rubber permitting movement of the joints without wrinkling of the outer surface of the covering.

A still further object is to provide a frame work having hollow shell portions for the larger parts of the body portions such as the chest and abdomen of human figures permitting great flexibility of the figure without wrinkling at the surface and saving in the amount of rubber required for the outer covering as well as reduction in weight of the completed figure.

The invention is particularly concerned with the method of making the manikin or figures simulating animals, etc. This method comprises, broadly, making the jointed skeleton or framework, providing a core substantially the same in outline as the skeleton except that the parts of the core corresponding to the joints of the skeleton are enlarged so that the ruber covering which is molded on the core will have spaces therein at the jointed portion sufficiently large to permit free movement of the joints without substantially disturbing the outer surface of the covering. The sponge rubber covering is molded in two or more parts on the core and on being removed therefrom these parts are applied over the skeleton or framework and vulcanized together or attached in any suitable manner. The result of this process is a flexible jointed figure in which the rubber covering fits closely on all parts of the skeleton except at the joints at which portions there is left sufficient space for bending the joints without wrinkling the rubber covering. By this method of making the device the rubber covering will be relatively thin at the joints and due to the shell construction of the frame at the larger portions an undue weight of the figure is avoided.

Referring to the drawings, which are made a part of this application and in which similar reference characters indicate similar parts:

Figure 1 is a view showing the skeleton or frame-work for a manikin in section surrounded by the rubber covering for one half of the figure.

Figure 2 is a vertical sectional view of the covering, the upper portion being a central section and the lower or leg portion being a section of the central section of the right leg of the figure. The skeleton or frame is shown in this figure in side elevation except the head portion and the pelvic tube which are in section.

Figure 3 is a view in elevation of one half of the molded covering for a manikin. The stippled portion of this figure represents the hollow space for enclosing the skeleton structure when the two halves of the covering are assembled and joined together. The stippled portion also indicates the form of the core on which the covering is molded.

Figure 4 is similar to Figure 3 and taken at right angles to the view shown in Figure 3. The stippled portion of Figure 4 illustrates the internal cavity of the figure as well as the shape of the core on which the covering is molded.

Figure 5 shows partly in section a joint structure of the skeleton, such as an elbow joint, Figures 6 and 7 show details of joint structures.

Figure 8 is a sectional view of a portion of the skeleton frame, and

Figure 9 is a similar view of a skeleton member of different construction.

In Figures 1 and 2 of the drawings the skeleton or frame-work of manikin or simulation of a human figure is indicated generally at A, while the outer covering corresponding to the flesh of such figure is indicated at B. The skeleton is made of tubular metal frame-work of aluminum or similar light metal although other material having sufficient strength, rigidity and lightness may be employed.

Referring to Figures 1 and 2, the chest portion of the frame comprises a vertical tubular portion 1 supporting a horizontal tubular portion 2 which carries at either end balls 3 and 4 forming a part of the shoulder joints. The upper arm portions comprise tubular members 5 and 6 which are at their upper ends provided with sockets engaging the balls 3 and 4 to form universal joints at the shoulders of the figure. The element 2 has mounted thereon a short vertical tubular section 7 which has a threaded engagement with a socket portion 8. The socket 8 partially encloses a ball 9 which has an extension upon which the head portion 10 of the figure is mounted. The ball 9 is held in frictional engagement with the socket 8 by means of a compression spring 12 which presses the washer 13 against the ball 9. Pressure is put on spring 12 when the parts 7 and 8 are screwed together and by this means the friction between the ball 9 and socket 8 may be adjusted. A similar method of adjustment is employed in all of the joints of the figure. The mounting 10 for the head may take any desired size and shape and may be made detachable where it is found desirable to make up a figure to which different heads may be applied. The tube 1 has a screw threaded section 14 at its lower end forming a socket for the ball 15 to form a joint in the spine of the skeleton. The ball 15 is held in frictional engagement with the socket 14 by means of a compression spring 16 and washer 17 the pressure being regulated by the screw thread engagement of the parts 1 and 14. The upper end of the spring 16 abuts against a washer or stop 18 held fast in tube 1 as by welding or by a pin passing through the tube. The springs in the other joints are held in a similar manner. Supported by the parts 1 and 2 is a hollow shell 19 forming that portion of the skeleton corresponding to the chest of the human figure.

The ball 15 is attached to or integral with a frame portion 20 having a vertical extension and two downwardly diverging extensions 21 and 22 corresponding to the pelvis of the human figure. The lower portion of the parts 21 and 22, are provided with sockets for the reception of balls 24 and 25 carried on the upper ends of tubes 26, 27 corresponding to the thigh bones of the human skeleton. To the portion 20 is attached the hollow shell 28 which conforms generally to the shape of the interior of the human figure in the region of the abdomen and pelvis. This shell has two openings in its lower portion through which the socket portions of tubes 21 and 22 extend.

Tubular members 29 and 30 carry the balls 31, 32 which form parts of the knee joints of the figure and are mounted in sockets in the lower ends of tubes 26 and 27. The tubes 26, 27, 29 and 30 are made in two parts with threaded connections and are provided with compression springs to hold the balls firmly in the socket at the lower ends of these tubes.

The foot portions 33, 34 carry balls 35, 36 which are held in the sockets in the lower ends of tubes 29 and 30 as previously described.

The joints in the forearms are formed in the same manner as those described in connection with the upper arms. The joints of the hands, including the finger joints, may be constructed as above described where it is found desirable to use joints in these members.

In Figure 5 there is shown an elbow joint in which the tube 5 is provided at its lower end with a ball 37 mounted in a socket 38 at the end of tube 39 corresponding to the bone structure of the fore-arm. In this figure the tube 39 has a section 40 forming a socket for the ball 41 forming the wrist joint. The balls 37 and 41 are held in position by a spring 42 and washers 43, 44. The sections of tube 39 are screw threaded at 45. The socket 38 has a cut-away portion at 46 to permit freer movement of the joint when it is bent to as much as a right angle. This feature is also shown in Figures 6 and 7. In Figure 5 the outer covering of sponge rubber is shown at 47. The stippled part of this figure indicates the spacing of the rubber around the joint to permit free movement of the joint without distortion of the covering. The relationship of these parts is more clearly shown in Figures 6 and 7. This construction is of advantage where the connected members have to be bent to an angle approaching a right-angle or greater.

Figure 8 illustrates a tubular joint structure which is found useful where it is desired to use compression springs of smaller diameter than the tubes enclosing such spring. In the figure the tube 47 is provided with a socket at its upper end enclosing the ball 48 and at its lower end with a threaded tubular extension 49. Mounted in any suitable manner in the extension 49 is a tubular member 50 closed at its lower end acting as a support for the spring 51 which is adapted to hold the washer 52 in contact with ball 48 to hold it in tight engagement with the socket at the upper end of tube 47. The tension of spring 51 may be adjusted by means of the screw threaded connection between the parts 47 and 49.

Figure 9 is a sectional view of a skeleton member of considerable length and in which it is not desirable to use a spring the full length of the member. In order to do this two short springs are employed, one at each end of the member. The tube 53 is threaded at both ends and provided interiorly with partitions or stops 54, 55 to form abutments for the springs 56, 57. At its upper end tube 53 is provided with a screw threaded socket member 58 enclosing the ball 59 and washer 60. When section 58 is screwed to 53 the ball 59 is clamped in the socket. The extension 61 of ball 59 is designed to support a tube similar to 58. The lower end of tube 53 is provided with a threaded socket member 62 enclosing a ball 63 which may be attached to another tube. The ball 63 is spring pressed in its socket by a spring 56 and washer 64. Structures of the type shown in Figure 9 may be employed in skeletons or frame structures where the joints are separated a considerable distance since most of the distance between joints can be taken care of by the central part of the tube, which may be of any length, and only short socket sections and short springs are required.

Referring to Figure 3, which is intended to show the rubber covering as molded for the rear half of a human figure or manikin, the head portion 70 is shown as provided with a cavity suitable for the reception of the back half of the shell 10 (Figs. 1 and 2) as indicated by the stippling at 71. The stippled portions of the remainder of the figure indicate the concave inner face of the covering which engages the skeleton structure as illustrated in Figures 1 and 2. The enlargements of the stippled portions at the joints as at 72, 72 for the shoulders, at 73, 73 for the elbows, at 74, 74 for the hip joints and at 75, 75 for the knee joints, are for the purpose of providing sufficient free space inside the covering and adjacent the joints to permit a certain amount of freedom of movement of the joints without wrinkling the covering. Due to these enlargements the covering is relatively thin adjacent the joints and as a consequence when a member is bent into a desired position it will remain in that position, the rubber not having sufficient elasticity to overcome the friction of the joint to return the member to its original molded position relative to the remainder of the figure. These cavities are provided around all of the joints of the figure. Figure 4 is intended to illustrate the appearance of the sponge rubber covering from a point of view at right angles to that of Figure 3. In Figure 4 the stippled portion 76 shows the concave inside of the covering about the abdominal cavity of the figure within which the shell 28 (Figs. 1 and 2) is located in the completed figure, 77 indicates the cavity of the chest portion for reception of the shell 19 (Figs. 1 and 2).

As pointed out above Figure 3 shows the molded form or covering for the rear half of a manikin. The front half is molded in the same manner to conform to the front half of the figure, the general outline of these parts being shown in section in Figure 2. The method of making each half of the figure is to provide a mold for the outside of one half of the figure and place therein a core conforming to the stippled portion of Figure 3 and mold the rubber between the outer mold and the core to form one half of the cover. The other half is then molded in the same manner. Figure 1 shows one half of the covering assembled with respect to the skeleton frame, the other or front half is placed on the front of the frame and the two halves vulcanized together or attached in any suitable manner to form the complete figure.

While the drawings illustrate a figure in which the cover is molded in two parts, the invention is not so limited, since the figures to be made may be composed of any number of separately molded parts which may be assembled around the frame and vulcanized together.

What I claim is:

1. In combination, a jointed frame skeleton of an animal figure, a hollow sponge rubber covering for said frame skeleton, the outer surface of said covering conforming to the configuration of the animal simulated, the interior of said covering closely fitting the frame members between the joints and having enlarged cavities around the joints to permit free movement thereof.

2. In a manikin, a jointed skeleton, a sponge rubber covering for said skeleton, said covering mounted on said skeleton and spaced therefrom at the joints and closely fitting the skeleton members between the joints.

3. In a manikin, a skeleton frame comprising tubular members connected by means of ball and socket joints, a sponge rubber covering for said frame, said covering being spaced from said frame at the joints thereof and closely fitting said frame between the joints.

4. In a manikin, a skeleton frame composed of tubular members provided with ball and socket joints, a shell mounted on said frame and defining the chest portion of the skeleton, a shell also mounted on said frame and defining the abdominal portion of the manikin and a sponge rubber covering enclosing the frame and having its outer surface conforming to the desired configuration of the manikin.

5. In combination, a jointed frame skeleton of an animal figure, a hollow sponge rubber covering for said frame, the outer surface of said covering conforming to the outer configuration of the animal simulated, and the inner surface of said covering closely fitting the members of the frame skeleton except at the joints of said skeleton.

6. In a manikin in combination a frame skeleton, the members of said skeleton being attached by means of ball and socket friction joints, a covering for said skeleton conforming to the shape of the human figure, said covering having cavities therein at the joints of the skeleton and elsewhere closely fitting the skeleton members.

7. In combination, a frame skeleton of an animal figure provided with ball and socket joints for its several members, a flexible elastic covering for said frame, the outer surface of said covering conforming to the configuration of the animal figure simulated and closely fitted on the members of the frame, said covering having on its inner side enlarged cavities surrounding the joints of the frame to avoid wrinkling the covering at the joints when the members of the frame are moved to different positions.

LANDY R. HALES.